Feb. 27, 1968     C. R. TALMAGE     3,370,947
METHOD OF SECURING A SINTERED METAL BRAKE TRACK
IN A BRAKE DRUM SHELL BY EXPANDING
A GREEN COMPACT DURING SINTERING
Filed Feb. 3, 1964

INVENTOR.
CHARLES ROBERT TALMAGE
BY
*Barnes, Kisselle, Raisch, & Choate*
ATTORNEYS United States Patent Office 3,370,947
Patented Feb. 27, 1968

3,370,947
METHOD OF SECURING A SINTERED METAL BRAKE TRACK IN A BRAKE DRUM SHELL BY EXPANDING A GREEN COMPACT DURING SINTERING
Charles Robert Talmage, Bowery Road, New Canaan, Conn. 06840
Filed Feb. 3, 1964, Ser. No. 342,160
1 Claim. (Cl. 75—208)

ABSTRACT OF THE DISCLOSURE

For purposes of summarizing the disclosure and not by way of limiting the invention, a brake drum is fabricated with a sintered metal brake track using a growth-type powder mixture in the green compact which is to form the track. The powder mixture is primarily iron powders together with a small percentage of copper and a very slight amount of graphite. The mixture and the compacting pressure are selected so that the compact will expand radially during sintering under predetermined atmosphere, time and temperature conditions. The outside diameter of the green compact is slightly smaller than the diameter of a steel brake drum shell into which the compact is inserted prior to sintering. The powder mixture together with the compacting pressure and the sintering conditions are also selected so that the compact, if unrestrained, would expand radially to a diameter greater than the diameter of the shell. The compact assembled within the shell is then sintered under the predetermined atmosphere, time, and temperature conditions, causing the compact to expand radially against the shell. Expansion of the compact during sintering maintains the compact in intimate contact with the shell to facilitate an improved bond therebetween and provide a frictional fit therebetween wherein the brake track in the finished brake drum is held in radial compression by the shell.

This invention relates to the method of securing a sintered metal compact in a solid part and the product produced thereby and, in particular, to a brake drum having a brake track composed of sintered iron powder which is physically bonded to a brake drum shell by expanding the compacted iron powder during a sintering operation.

This invention contemplates securing a sintered metal compact in a mating part by a method which is simple, effective, and economical. In particular, this invention contemplates a brake drum having a steel brake drum shell with a brake track composed of sintered metal and secured in the shell by a method which is simple, effective, and economical.

Figure 1:
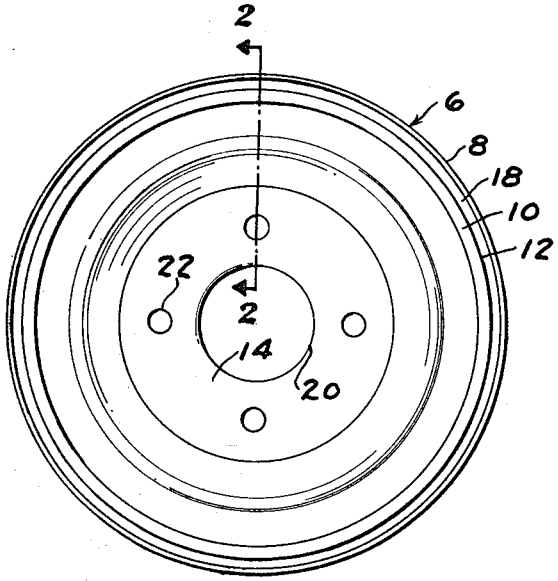
FIG. 1 shows a finished brake drum looking into the cavity thereof, the brake drum having a sintered metal brake track secured within a brake drum shell in accordance with this invention.
Figure 2:
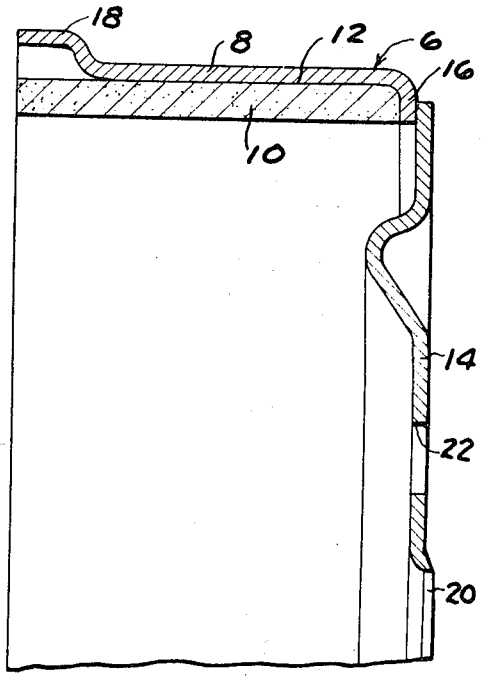
FIG. 2 is an enlarged fragmentary section taken through line 2—2 of FIG. 1.

By way of description and not for purposes of limitation, FIGS. 1 and 2 show a finished brake drum 6 comprising a generally cylindrical steel shell 8, a brake track 10 that lines the inner cylindrical surface 12 of shell 8, and a drum back 14 which is welded to a radially inward extending flange 16 on shell 8. Shell 8 has an outwardly flared portion 18 that forms a dust seal when drum 6 is assembled with other brake parts. Back 14 is provided with a central aperture 20 and bolt holes 22 for assembling drum 6 on other wheel parts.

In accordance with this invention, it has been found that certain metal powder compacts composed primarily of ferrous powders grow or swell when the compact is sintered. The growth is permanent. According to this invention, track 10 is secured in shell 8 with a tight physical bond produced by radial growth of track 10 during a sintering operation.

Figure 3:
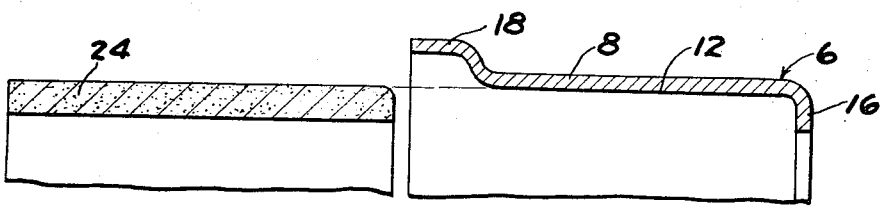
FIG. 3 is a fragmentary section illustrating a cylindrical compact composed of growth-type powders and a steel brake drum shell into which the compact is inserted during the making of the brake drum shown in FIGS. 1 and 2.
Figure 4:
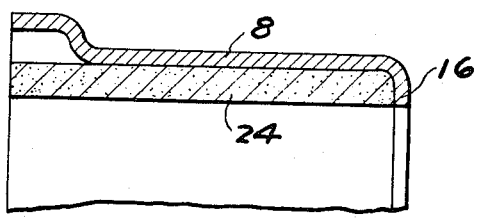
FIG. 4 is a fragmentary section illustrating the compact and shell of FIG. 3 after they have been assembled.

A mixture of powders which will grow during sintering are compacted by conventional pressing techniques into a green compact 24 in the form of a cylindrical sleeve (FIG. 3). Compact 24 has an axial dimension similar to the finished track 10 and an outside diameter just slightly less than the inside diameter of shell 8 so that compact 24 may be inserted within shell 8 with a minimum clearance between the parts. Compact 24 is assembled within shell 8 (FIG. 4) and shell 8 with compact 24 assembled therein is then heated in a controlled atmosphere to a temperature which will sinter the powder of compact 24 and also cause compact 24 to grow or swell, producing a strong, physical bond between track 10 and shell 8 in the finished drum 6. The radial clearance between surface 12 and compact 24 prior to sintering is less than the dimension change produced by sintering an unconfined compact.

By way of example, a typical growth-type powder mixture has the following composition by weight of the total mixture:

| | Percent |
|---|---|
| Iron powder, 100 mesh, reduced oxide | 92.75 |
| Copper powder, 200 mesh, reduced oxide | 5.00 |
| Graphite, natural, extra fine | 1.00 |
| Lubricant, lithium stearate | 1.25 |

The iron powder has a typical chemical analysis as follows:

| | Percent |
|---|---|
| Fe | 98.8 |
| $SiO_2$ | 0.1 |
| C | 0.04 |
| $H_2$-loss | 0.3 |
| S | 0.007 |
| P | 0.01 | and a typical screen analysis of:

| Tyler mesh: | Percent |
|---|---|
| +100 | 0.1 |
| +150 | 7.0 |
| +200 | 22.0 |
| +250 | 17.0 |
| +325 | 27.0 |
| −325 | 27.0 |

By way of further example, when the above powder mixture was compacted into a 1.131 inch diameter test slug 0.269 inch long at a pressure of 60,000 p.s.i. and then sintered in a dissociated ammonia atmosphere furnace as follows:

30 min. @ 1000° F. (preheat)
30 min. @ 2100° F. (sinter)
30 min. cool in furnace atmosphere in 100° F. area of furnace.

The diameter of the test slug increased to 1.141 inches.

When a powder mixture having the same composition and same iron powder as that set forth above was compacted at a pressure of 60,000 p.s.i. into a brake track sleeve having a nominal length of 3.50 inches, an inside diameter of 8.925 inches, and an outside diameter of 9.485 inches, and then sintered in a dissociated ammonia atmosphere furnace as follows:

1 hour @ 1000° F. (preheat)
1 hour @ 2100° F. (sinter)
1 hour cool in furnace atmosphere in 100° F. area of furnace.

The inside diameter increased to 8.985 inches and the outside diameter increased to 9.575 inches. When a green compact sleeve as set forth above was assembled within a close-fitting, brake drum shell and then sintered as set forth above, an effective physical bond between the brake track and the shell was achieved. Generally, the 9.485 inches outside diameter of the green compact sleeve was within tolerances of ±0.005 of an inch to the inside diameter of the brake drum shell.

The extent of dimension change or growth that occurs during sintering can be varied depending on the size and density of the compact 24, the composition of the powder mixture, and the sintering atmosphere, times, and temperatures. Growth-type powder mixtures of the type set forth above, which include iron powder and copper powder, are particularly advantageous for use in fabricating brake drums. In addition to a physical bond, a metallurgical or brazed bond between the mating surfaces of brake track 10 and the shell 8 may be obtained by properly selecting the composition, the sintering atmosphere, time, and temperature. The presence of copper in track 10 improves physical properties of the finished brake drum 6, including better friction characteristics, better wear characteristics, and increased thermal conductivity.

I claim:
1. In the method of making a brake drum of the type having a ferrous alloy shell formed with a generally cylindrical body portion which is lined with an annular brake track, said shell being constructed and adapted to assemble said drum on other wheel parts, the steps of compacting a sleeve-like compact from a growth type ferrous powder mixture comprising primarily iron and copper powders which cause said compact to permanently expand radially to a predetermined peripheral dimension when said compact is sintered under predetermined atmosphere, time and temperature conditions and radial expansion of said compact is unrestrained, said compact having a peripheral dimension prior to sintering that is smaller than the peripheral dimension of said body portion of said shell so as to provide a minimum radial clearance therebetween when said compact is inserted into said body portion, said predetermined dimension of said compact being greater than the peripheral dimension of said body portion, inserting said compact in said body portion of said shell, and then sintering said compact and simultaneously expanding said compact radially while said shell restrains radial expansion of said compact by subjecting said shell with said compact assembled therein to said predetermined atmosphere, time and temperature conditions to thereby expand said compact against said body portion during sintering to provide an effective physical bond therebetween and cause the sintered compact to be at least in part retained in said shell by a frictional fit.

References Cited

UNITED STATES PATENTS

| | | | |
|---|---|---|---|
| 2,287,952 | 6/1942 | Tormyn | 75—208 X |
| 2,390,160 | 12/1945 | Marvin | 29—149.5 |
| 2,404,808 | 7/1946 | Lowey | 29—149.5 |
| 2,462,821 | 2/1949 | Wellman | 29—149.5 |
| 1,766,865 | 6/1930 | Williams et al. | |
| 2,191,936 | 2/1940 | Lenel | 75—214 |

OTHER REFERENCES

Treatise on powder metallurgy, vol. 2 by Goetzel, pp. 412–414. Published 1950 by Interscience Publishers.

Goetzel Treastise on Powder Metallurgy, vol. I, Interscience Publishers, New York, N.Y., 1949. TN 695 G6, pp. 521–522.

L. DEWAYNE RUTLEDGE, *Primary Examiner.*

JOHN F. CAMPBELL, *Examiner.*

P. M. COHEN, R. L. GRUDZIECKI,
*Assistant Examiners.*